United States Patent
Komuro

(10) Patent No.: US 10,273,868 B2
(45) Date of Patent: Apr. 30, 2019

(54) FLUID CONTROL VALVE

(71) Applicant: AISIN SEIKI KABUSHIKI KAISHA, Kariya-shi, Aichi-ken (JP)

(72) Inventor: Kenichi Komuro, Obu (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 15/704,250

(22) Filed: Sep. 14, 2017

(65) Prior Publication Data

US 2018/0230890 A1    Aug. 16, 2018

(30) Foreign Application Priority Data

Feb. 14, 2017 (JP) .................. 2017-024837
Feb. 14, 2017 (JP) .................. 2017-024838

(51) Int. Cl.
| | |
|---|---|
| *F01P 7/16* | (2006.01) |
| *F16K 31/06* | (2006.01) |
| *F16K 27/02* | (2006.01) |
| *H01F 1/00* | (2006.01) |

(52) U.S. Cl.
CPC ............. *F01P 7/16* (2013.01); *F16K 27/029* (2013.01); *F16K 31/0658* (2013.01); *F16K 31/0675* (2013.01); *H01F 1/00* (2013.01); *F16K 31/0651* (2013.01)

(58) Field of Classification Search
CPC .............. F02M 26/53; F02M 47/027; F02M 2025/0845; F02M 63/0017; F01L 2101/00; F01L 3/02; F01L 3/22; F01L 2009/0432; F16K 31/0693; F16K 27/029; F16K 31/0675
See application file for complete search history.

(56) References Cited

U.S. PATENT DOCUMENTS

| | | | |
|---|---|---|---|
| 9,074,517 B2 | 7/2015 | Matsusaka et al. | |
| 9,151,210 B2 | 10/2015 | Komuro et al. | |
| 2001/0017360 A1* | 8/2001 | Watanabe | ........... F16K 31/0655 251/129.17 |
| 2002/0104979 A1* | 8/2002 | Kato | .................. F02M 25/0836 251/129.17 |
| 2005/0204732 A1* | 9/2005 | Kouzu | ...................... F01N 3/22 60/307 |

(Continued)

FOREIGN PATENT DOCUMENTS

| | | |
|---|---|---|
| JP | 2013-525653 A | 6/2013 |
| JP | 2014-101943 A | 6/2014 |
| JP | 2015-121247 A | 7/2015 |

*Primary Examiner* — Long T Tran

(74) *Attorney, Agent, or Firm* — Buchanan Ingersoll & Rooney PC

(57) ABSTRACT

A fluid control valve includes: a housing having an inflow port and an outflow port of a fluid; a first magnetic body in which a circulation hole is provided; a solenoid causing a magnetic flux to flow through the first magnetic body; a second magnetic body attracted to the first magnetic body by flowing of the magnetic flux generated from the solenoid to abut against a peripheral portion of the circulation hole to close the circulation hole; a biasing member biasing the second magnetic body in a direction of separating from the first magnetic body; and a stopper fixed to the housing on a side of the outflow port and preventing movement of the second magnetic body by a biasing force of the biasing member.

11 Claims, 11 Drawing Sheets

(56) References Cited

U.S. PATENT DOCUMENTS

| | | | | |
|---|---|---|---|---|
| 2008/0251613 A1* | 10/2008 | Akabane | ............ | F02M 51/0675 239/585.1 |
| 2013/0020513 A1* | 1/2013 | Matsusaka | .............. | F01P 7/165 251/63.6 |
| 2013/0161548 A1* | 6/2013 | Matsusaka | ................ | F01P 7/16 251/129.22 |
| 2013/0220243 A1* | 8/2013 | Matsusaka | ................ | F01P 7/14 123/41.01 |

\* cited by examiner

FLUID CONTROL VALVE

CROSS REFERENCE TO RELATED APPLICATIONS

This application is based on and claims priority under 35 U.S.C. § 119 to Japanese Patent Applications 2017-024837 and 2017-024838, both filed on Feb. 14, 2017, the entire contents of which are incorporated herein by reference.

TECHNICAL FIELD

This disclosure relates to a fluid control valve capable of intercepting circulation of a fluid from a pump.

BACKGROUND DISCUSSION

In the related art, in a cooling system for cooling, for example, an internal combustion engine such as an automobile engine, a fluid control valve which is provided in a circulation flow path for circulating cooling water through the internal combustion engine and a heater core for heating by a water pump is known (for example, see JP 2015-121247A (Reference 1)). The fluid control valve of Reference 1 is known as a fluid control valve including a valve seat which has a plate-like first magnetic body (fixed yoke in the Reference) insert-molded in a housing, a valve body which has a plate-like second magnetic body (strip member in the Reference), and a solenoid which causes a magnetic flux to flow through the first magnetic body. The fluid control valve is provided with a biasing member (coil spring in the Reference) which biases the valve body toward a valve seat side.

In the fluid control valve of Reference 1, the water pump is stopped when the engine is stopped and the valve body is in a valve closed state by a biasing force of the biasing member. When the engine is started, the water pump is driven and a water pressure acts on the valve body. However, the valve body is pressed against the valve seat and the valve closed state is held by a driving force by energization of the solenoid and the biasing force of the biasing member. When heating is used after the engine is started, the energization of the solenoid is released, and when the water pressure acting on the valve body exceeds the biasing force of the biasing member, the valve body is separated from the valve seat and is in an valve opened state, and thus cooling water flows through the heater core.

In the fluid control valve of the related art, the valve closed state is maintained until the water pressure exceeds the biasing force of the biasing member even when the solenoid is not energized. Therefore, when the water pressure is low at a time of starting of the engine, for example, in a case where there is a request to supply cooling water from a defroster, the heater core, an EGR cooler, or the like, there is a concern that the valve cannot be opened promptly. In addition, since the valve is always in the valve closed state when the engine is stopped, the valve body and the valve seat are fixed, and even if it is attempted to open the valve promptly after starting the engine, there is a concern that it is difficult to open the valve.

On the other hand, when the valve is in the valve opened state, even if the solenoid is energized, the valve is not closed until a sum of the driving force of the solenoid and the biasing force of the biasing member exceeds the water pressure. Therefore, in a case where it is desired to promote warm-up and perform heating when an engine speed is low, or the like, there is a concern that the valve cannot be closed promptly.

Thus, a need exists for a fluid control valve which is not susceptible to the drawback mentioned above.

SUMMARY

A feature of a fluid control valve according to an aspect of this disclosure resides in that the fluid control valve includes a housing that has an inflow port and an outflow port of a fluid; a first magnetic body in which a circulation hole through which the fluid circulates is provided; a solenoid that causes a magnetic flux to flow through the first magnetic body; a second magnetic body that is attracted to the first magnetic body by flowing of the magnetic flux generated from the solenoid so as to abut against a peripheral portion of the circulation hole to close the circulation hole; a biasing member that biases the second magnetic body in a direction of separating from the first magnetic body; and a stopper that is fixed to the housing on a side of the outflow port and prevents movement of the second magnetic body by a biasing force of the biasing member, in which a fluid pressure receiving portion for receiving a pressure of the fluid flowing in from the inflow port is provided between the first magnetic body and the second magnetic body to face a closing surface of the second magnetic body capable of closing the circulation hole.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment disclosed here of a fluid control valve will be described with reference to the drawings. In the embodiment, as an example of the fluid control valve, a fluid control valve V used for a cooling system of an engine E for an automobile will be described. However, the disclosure is not limited to the following embodiments and various modifications are possible without departing from the gist thereof.

Figure 1:
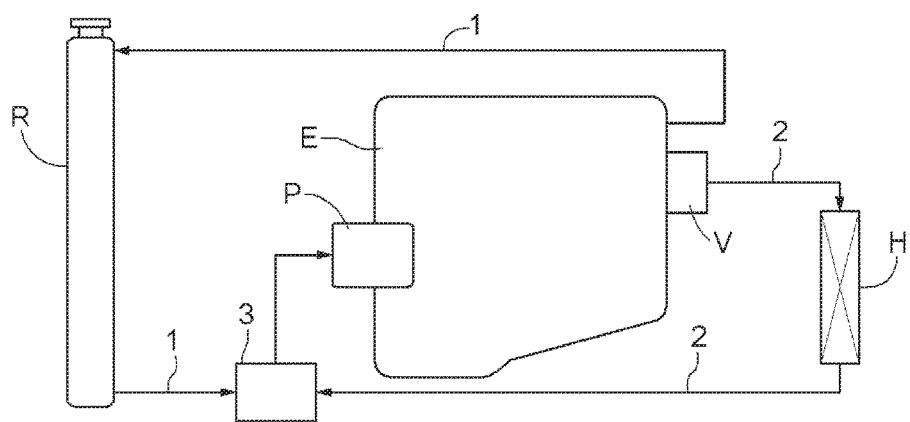
FIG. 1 is an explanatory view of an engine cooling system.

As illustrated in FIG. 1, the cooling system of the engine E includes a first circulation path 1 that circulates cooling water (an example of a fluid) between the engine E and a radiator R, a second circulation path 2 that circulates cooling water between the engine E and a heater core H, and a water pump P that supplies cooling water to the engine E. In the embodiment, the water pump P is constituted by a mechanical water pump that is rotated by obtaining a driving force from a crank pulley (not illustrated) via a timing belt and a flow rate changes in accordance with a rotation speed of the engine.

An outflow path of cooling water from the radiator R or the heater core H in the first circulation path 1 or the second circulation path 2 is connected to the water pump P via a thermostat valve 3. In the first circulation path 1, cooling water heated by the engine E is cooled in the radiator R and then is recirculated to the engine E via the thermostat valve 3. In the second circulation path 2, the fluid control valve V is disposed between the engine E and the heater core H and when the fluid control valve V is in a valve opened state, cooling water heated by the engine E flows into the heater core H that warms air in a passenger compartment. In this case, cooling water heat-exchanged and cooled in the heater core H is recirculated to the engine E via the thermostat valve 3.

On the other hand, in a case where a temperature of cooling water is lower than a predetermined temperature (warming-up completion temperature T1), the fluid control valve V is closed to prevent the temperature of cooling water from decreasing due to the heat exchange of the heater core H. In addition, in a case where the temperature of cooling water is low, the thermostat valve 3 is also closed and thereby cooling water does not circulate to the radiator R. Therefore, it is possible to promote the temperature rise of cooling water during a warming-up operation of the engine E, thereby improving fuel consumption.

First Embodiment

Hereinafter, a first embodiment will be described with reference to the drawings.

Figure 2:
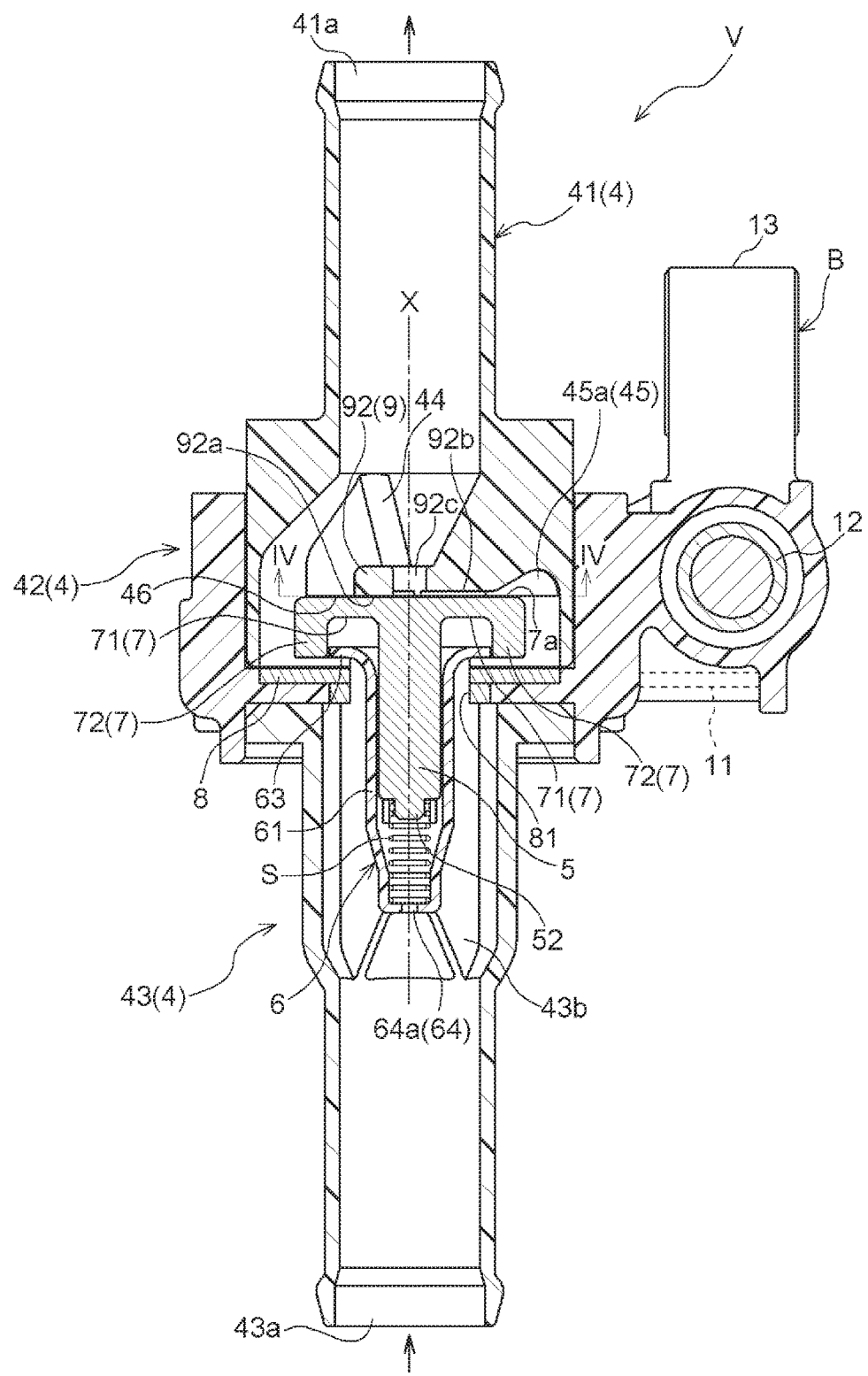
FIG. 2 is a longitudinal sectional view illustrating a fluid control valve in an opened state according to a first embodiment.
Figure 3:
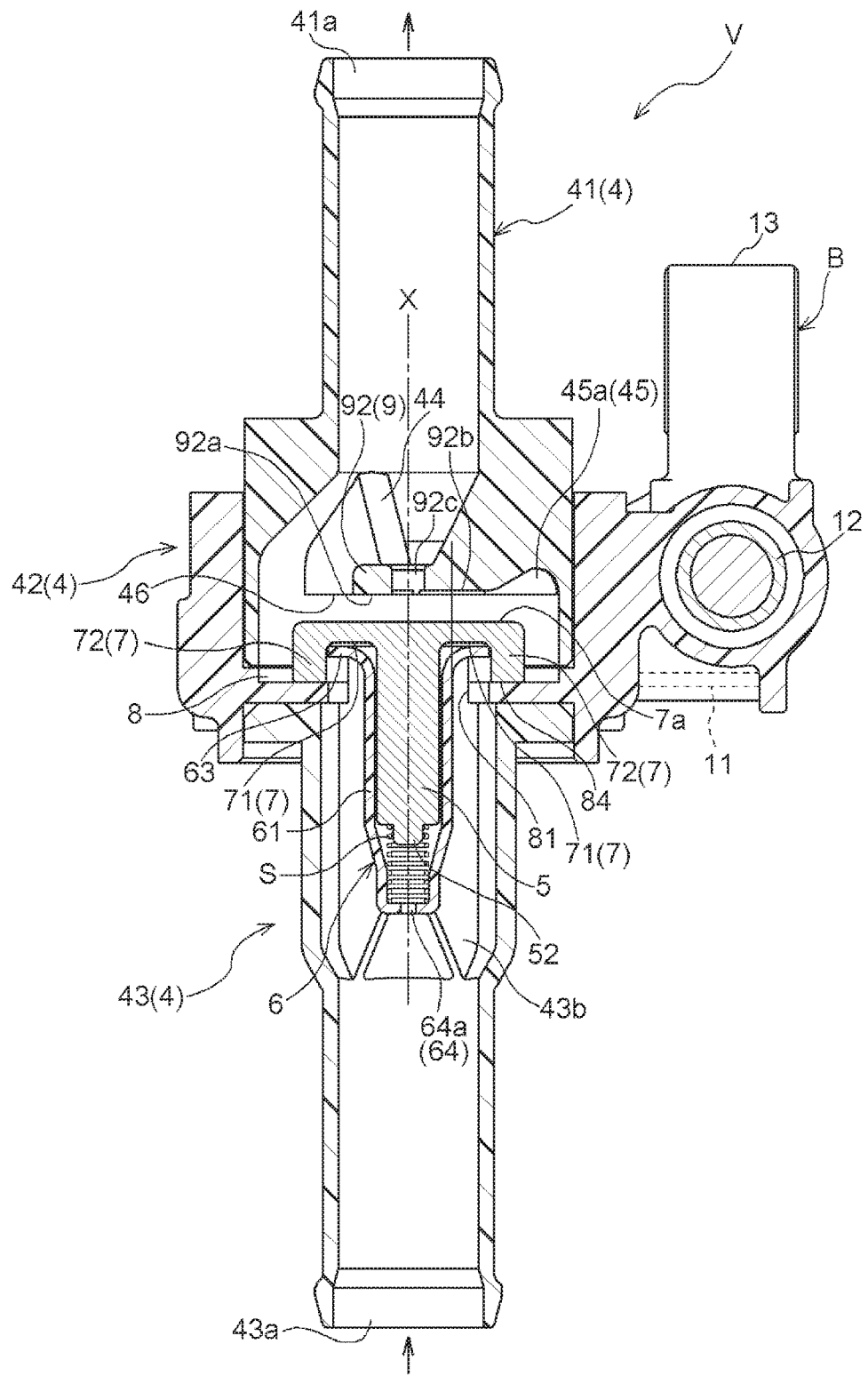
FIG. 3 is a longitudinal sectional view illustrating the fluid control valve in a closed state according to the first embodiment.

As illustrated in FIGS. 2 and 3, the fluid control valve V includes a housing 4, a stopper 9 that is fixed to the housing 4, a shaft member 5, a support member 6 that supports the shaft member 5, a coil spring S (an example of a biasing member) that is stored in an inside of the support member 6, a first magnetic body 8 as a valve seat, a solenoid B that causes a magnetic flux to flow through the first magnetic body 8, and a second magnetic body 7 that is integrally formed with the shaft member 5 as a valve body. In the embodiment, the first magnetic body 8, the shaft member 5, and the second magnetic body 7 are made of a magnetic material such as iron. In addition, the housing 4, the support member 6, and the stopper 9 are made of nonmagnetic resin, stainless steel, or the like.

The housing 4 includes a first housing 41 where the stopper 9 is fixed to an inside thereof, a second housing 42 in which the first magnetic body 8 is insert-molded, and a third housing 43 where the support member 6 is fixed to an inside thereof. The first housing 41, the second housing 42, and the third housing 43 are connected to each other by bolt fastening, adhesion, press fitting, or the like. Moreover, any two of the first housing 41, the second housing 42, and the third housing 43 may be integrally formed, or the first housing 41, the second housing 42, and the third housing 43 may be configured by four divisions or more.

In the first housing 41, an outflow port 41a of cooling water is formed in a cylindrical shape along an axial core X of the shaft member 5. In addition, a plurality (three in the embodiment) of extending portions 44 are formed to extend from an inner surface of the first housing 41 and the cylindrical stopper 9 is integrally formed at end portions of the extending portions 44. Moreover, the extending portions 44 and the stopper 9 may be separate members that are fixed to the first housing 41 by adhesion or the like.

Figure 4:
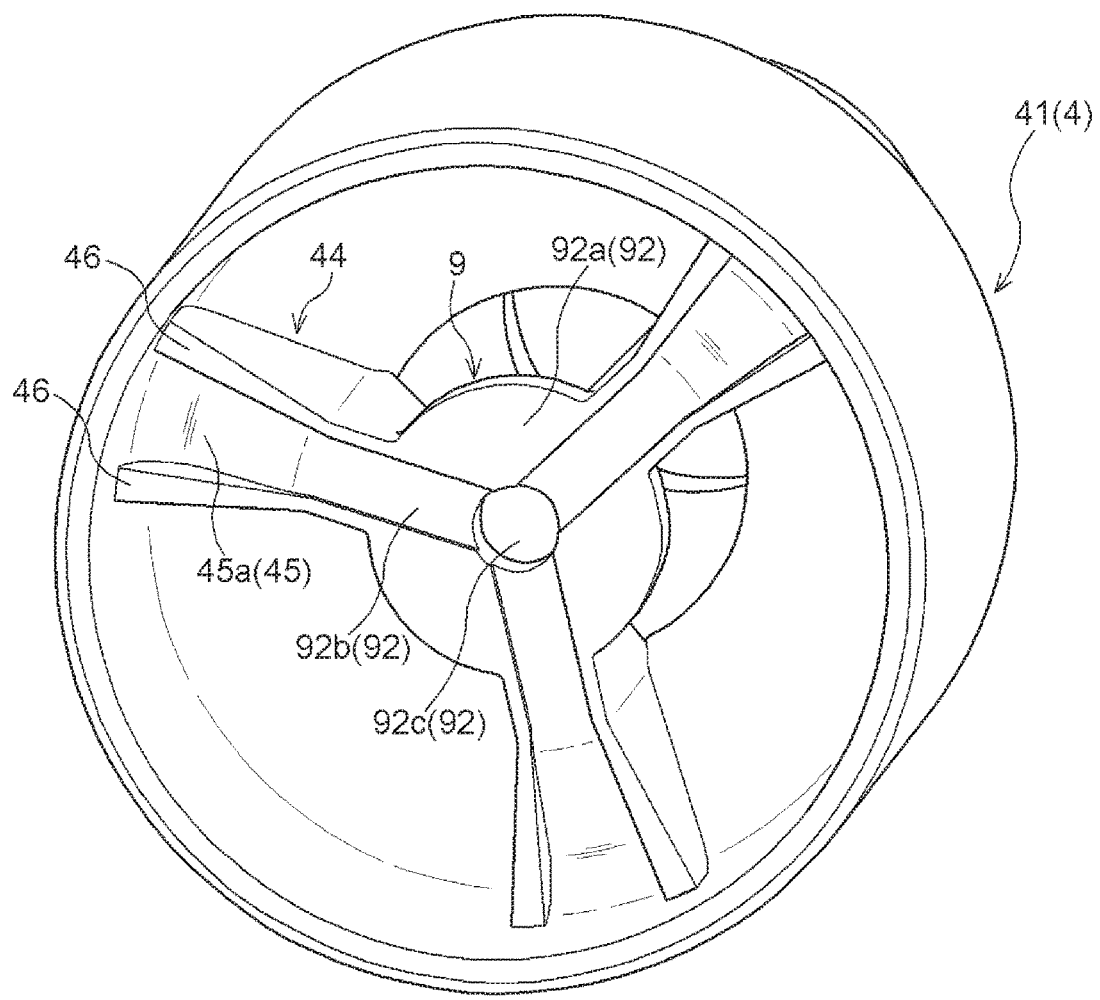
FIG. 4 is a cross sectional view that is taken along line IV-IV of FIG. 2.

As illustrated in FIG. 4, the extending portion 44 has a water passage 45 (an example of a flow path throttling portion) that is formed to be recessed in a direction in which the vicinity of a center of a bottom surface (surface of the inner surface of the first housing 41 facing a back surface 7a of the second magnetic body 7) is separated from the second magnetic body 7, and a side wall portion 46 that is formed to protrude to a second magnetic body 7 side on both sides in a circumferential direction with respect to the water passage 45 and in a radial direction. At the time of valve opening in which movement of the second magnetic body 7 by a biasing force of the coil spring S is prevented by the stopper 9, the bottom surface (same surface as a bottom surface 92a of the stopper 9) of the side wall portion 46 abuts against the back surface 7a of the second magnetic body 7, thereby preventing leakage of cooling water to a side of the water passage 45 (see FIG. 2). As described above, the water passage 45, whose flow path area is throttled, is formed at a part of the flow path between the back surface 7a of the second magnetic body 7 abutting against the stopper 9 and the inner surface of the first housing 41 to be recessed on the bottom surface of the extending portion 44 of the first housing 41.

In addition, as illustrated in FIGS. 2 and 4, a reservoir portion 45a in the water passage 45 is formed at a portion which is positioned on an outside in the radial direction with respect to the second magnetic body 7 to be further recessed on the bottom surface of the extending portion 44 in a direction of separating from the second magnetic body 7. The reservoir portion 45a has a function of storing cooling water circulating in the water passage 45 during opening the valve. Moreover, the reservoir portion 45a may be omitted.

The stopper 9 has an annular collar portion 92 connected to the extending portion 44 of the first housing 41. In the annular collar portion 92, a connection passage 92b (an example of the flow path throttling portion) connected to the water passage 45 is formed to be recessed in a direction in which the bottom surface 92a (surface facing the back surface 7a of the second magnetic body 7 in the inner surface of the first housing 41) is separated from the second magnetic body 7. Similar to the water passage 45, the connection passage 92b also has a function of throttling the flow path area during opening the valve when the second magnetic body 7 is separated from the first magnetic body 8. In addition, a through-hole portion 92c is formed at a center of the annular collar portion 92.

Therefore, as illustrated in FIG. 2, when the second magnetic body 7 is opened, cooling water flows into the reservoir portion 45a of the water passage 45 and circulates through the water passage 45, the connection passage 92b, and the through-hole portion 92c in this order. In this case, the back surface 7a of the second magnetic body 7 receives a water pressure (fluid pressure) and the second magnetic body 7 is pressed toward the first magnetic body 8 by cooling water circulating through the water passage 45 and the connection passage 92b. Moreover, since the biasing force by the coil spring S is set greater than the water pressure, the valve opened state is maintained when the solenoid B is not energized.

Returning to FIGS. 2 and 3, the flat plate-like first magnetic body 8 is insert-molded in the second housing 42. In addition, a fixed yoke 11 of the solenoid B which is described later is integrally formed on the side of the second housing 42.

An inflow port 43a of cooling water is cylindrically formed in the third housing 43 along the axial core X of the shaft member 5. In addition, a plurality (three in the embodiment) of flat plate portions 43b configured in a flat plate shape are formed on an inner peripheral surface of the third housing 43 to be extended, and the bottomed cylindrical support member 6 is integrally formed with the first magnetic body 8 at a tip of the flat plate portion 43b.

One end portion of the shaft member 5 is supported by the support member 6 so as to be movable inside the housing 4. An outer surface of the shaft member 5 is in sliding contact with an inner surface of the support member 6 and thereby the movement of the shaft member 5 is guided to the inner surface of the support member 6. In addition, the other end portion of the shaft member 5 extends to an outflow port 41a side with respect to the first magnetic body 8 and the second magnetic body 7 is integrally formed at the other end portion. Moreover, instead of integrally forming the shaft member 5 and the second magnetic body 7, a through-hole is provided at the center of the second magnetic body 7 and the other end portion of the shaft member 5 may be fixed (press fitted) to the through-hole.

The support member 6 is fixed to the third housing 43 on the inflow port 43a side and a side wall 61 enters a circulation hole 81 of the first magnetic body 8. That is, a sliding contact region of the shaft member 5 is ensured by the side wall 61 to enhance a support function of the support member 6 with respect to the shaft member 5.

Figure 5:
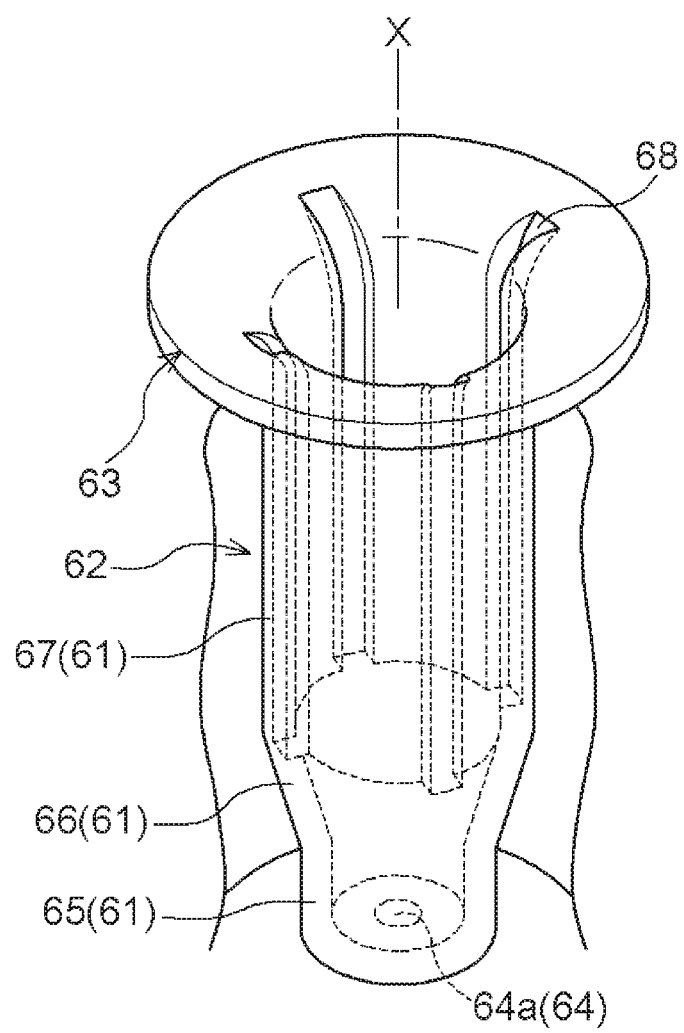
FIG. 5 is a perspective view of a support member according to the first embodiment.

As illustrated in FIG. 5, the support member 6 includes a cylindrical body 62 and an annular portion 63 (an example of the fluid pressure receiving portion) formed by enlarging a diameter of an opening end portion of the cylindrical body 62 on the second magnetic body 7 side outward in a radial direction. The cylindrical body 62 has a bottom portion 64 where a small hole 64a is formed at a center, a first erected portion 65 that is erected from the bottom portion 64 along the direction of the axial core X, a tapered portion 66 whose diameter is gradually increased from the first erected portion 65, and a second erected portion 67 that is erected from the tapered portion 66 along the direction of the axial core X so as to be the same diameter as the maximum diameter of the tapered portion 66. That is, the side wall 61 of the support member 6 is configured with the first erected portion 65, the tapered portion 66, and the second erected portion 67. The shaft member 5 which is described above is formed to be movable in a region of the second erected portion 67.

The annular portion 63 is disposed between the first magnetic body 8 and the second magnetic body 7 (see FIG. 2). Groove portions 68, which are recessed to the outside in the radial direction with respect to the shaft member 5, are formed on the inner surface of the annular portion 63. A plurality (four in the embodiment) of the groove portions 68 are provided at equal intervals along the circumferential direction and are disposed over the region of the annular portion 63 and the second erected portion 67 along the direction of the axial core X.

As illustrated in FIGS. 2 and 3, the coil spring S is stored in the inside of the support member 6 in a state of abutting against the end surface of the shaft member 5 and the bottom portion 64 of the support member 6 while being guided by a projection portion 52 formed at the other end portion of the shaft member 5. In the embodiment, the first erected portion 65 of the support member 6 and the inside of the tapered portion 66 form a storage space of the coil spring S (see FIG. 5). The coil spring S biases the shaft member 5 (second magnetic body 7) toward the outflow port 41a so that the second magnetic body 7 is separated from the first magnetic body 8.

Figure 6:
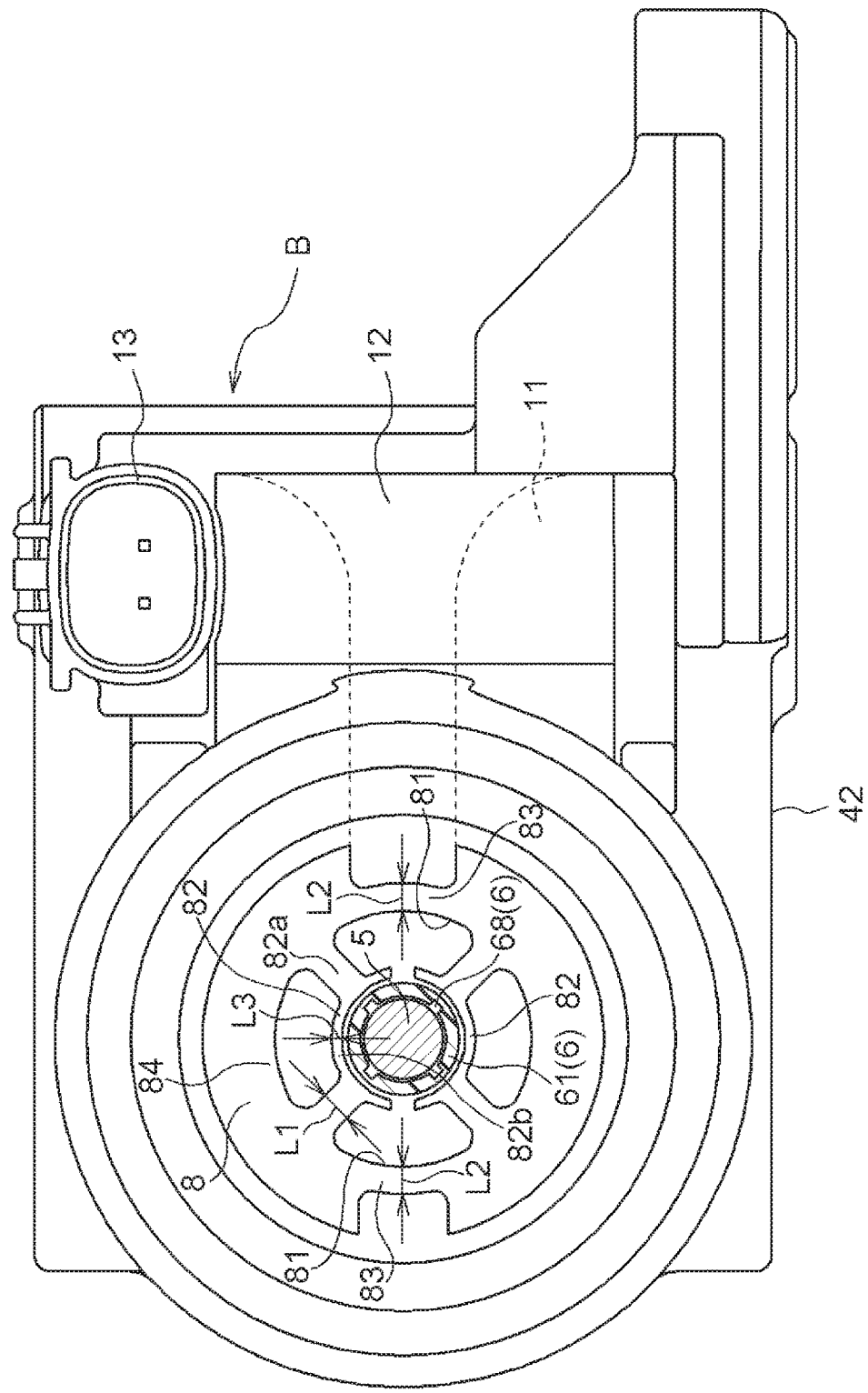
FIG. 6 is a plan view of a second housing according to the first embodiment.

The first magnetic body 8 is provided with the circulation hole 81 through which cooling water circulates and is disposed between the second magnetic body 7 and the support member 6 along the direction of the axial core X. As illustrated in FIG. 6, the first magnetic body 8 includes an annular peripheral portion 84 around the circulation hole 81, and the circulation hole 81 that is formed on an inside of the peripheral portion 84 in the radial direction. The peripheral portion 84 functions as a valve seat against which a protrusion portion 72 of the second magnetic body 7 which is described later abuts. The first magnetic body 8 is formed in a plate shape integrated with the fixed yoke 11 of the solenoid B and is insert-molded in the second housing 42 together with the fixed yoke 11.

The first magnetic body 8 has a pair of arm portions 82 that extend from the peripheral portion 84 of the circulation hole 81 to an inside in the radial direction. Each of the arm portions 82 has a pair of connection portions 82a that are connected to the peripheral portion 84 of the circulation hole 81 and are formed in a linear shape, and an arcuate portion 82b that arcuately connects the end portions of the pair of connection portions 82a to each other. An inner peripheral surface of the arcuate portion 82b overlaps an outer peripheral surface of the shaft member 5 in the radial direction in a state where the nonmagnetic support member 6 is interposed therebetween. In addition, the first magnetic body 8 is provided with a pair of magnetic flux throttling portions 83 at portions of the peripheral portion 84 through which the magnetic flux passes. The pair of arm portions 82 are provided so as to extend from regions on both sides of the peripheral portion 84 in which the pair of magnetic flux throttling portions 83 are interposed therebetween. A width L1 of the connection portion 82a (a portion of the arm portion 82 extending from the peripheral portion 84 in the radial direction) of the arm portion 82 is formed greater than a width L2 of the magnetic flux throttling portion 83. In addition, in the embodiment, a width L3 of the arcuate portion 82b of the arm portion 82 is formed to be smaller than the width L1 of the connection portion 82a or the width L2 of the magnetic flux throttling portion 83 to increase a magnetic flux density. Moreover, the width L3 of the arcuate portion 82b may be formed to be greater than the width L2 of the magnetic flux throttling portion 83 similar to the width L1 of the connection portion 82a.

As illustrated in FIGS. 2 and 3, the solenoid B has the plate-like fixed yoke 11 made of a magnetic material such as iron, an electromagnetic coil 12 that generates a magnetic field by energization, a socket 13 that electrically connects the electromagnetic coil 12 to an outside drive circuit (not illustrated). That is, the magnetic flux flows through the first magnetic body 8 via the fixed yoke 11 by energizing the electromagnetic coil 12.

The second magnetic body 7 functions as a valve body that is integrally formed with the other end portion of the shaft member 5 so as to be coaxial with the axial core X of the shaft member 5. The second magnetic body 7 has a disc-shaped closing surface 71 capable of closing the circulation hole 81 of the first magnetic body 8, and the cylindrical protrusion portion 72 that protrudes from an outer peripheral portion of the closing surface 71 to the first magnetic body 8. During closing the valve, the protrusion portion 72 abuts against the peripheral portion 84 of the circulation hole 81 so that the closing surface 71 of the second magnetic body 7 closes the circulation hole 81 of the first magnetic body 8 (see FIG. 3).

On the other hand, during opening the valve, the annular collar portion 92 of the stopper 9 abuts against a portion on the inside of the back surface 7a of the second magnetic body 7 in the radial direction to prevent the movement of the second magnetic body 7 (see FIG. 2). In this case, cooling water circulates from the inflow port 43a toward the outflow port 41a with a space formed between the outside of the second magnetic body 7 in the radial direction and the extending portion 44 of the first housing 41 as a main flow path. In addition, a sub-flow path, through which cooling water flows into the reservoir portion 45a of the water passage 45 and circulates through the water passage 45 of the extending portion 44, the connection passage 92b of the stopper 9, and the through-hole portion 92c of the stopper 9 in this order, is also formed. Moreover, in the embodiment, the stopper 9 is disposed on the inside with respect to the protrusion portion 72 of the second magnetic body 7 in the radial direction, an increase in a circulation resistance of a main flow path formed on the outside of the second magnetic body 7 with respect to the closing surface 71 in the radial direction is suppressed.

Control Example

Figure 7:
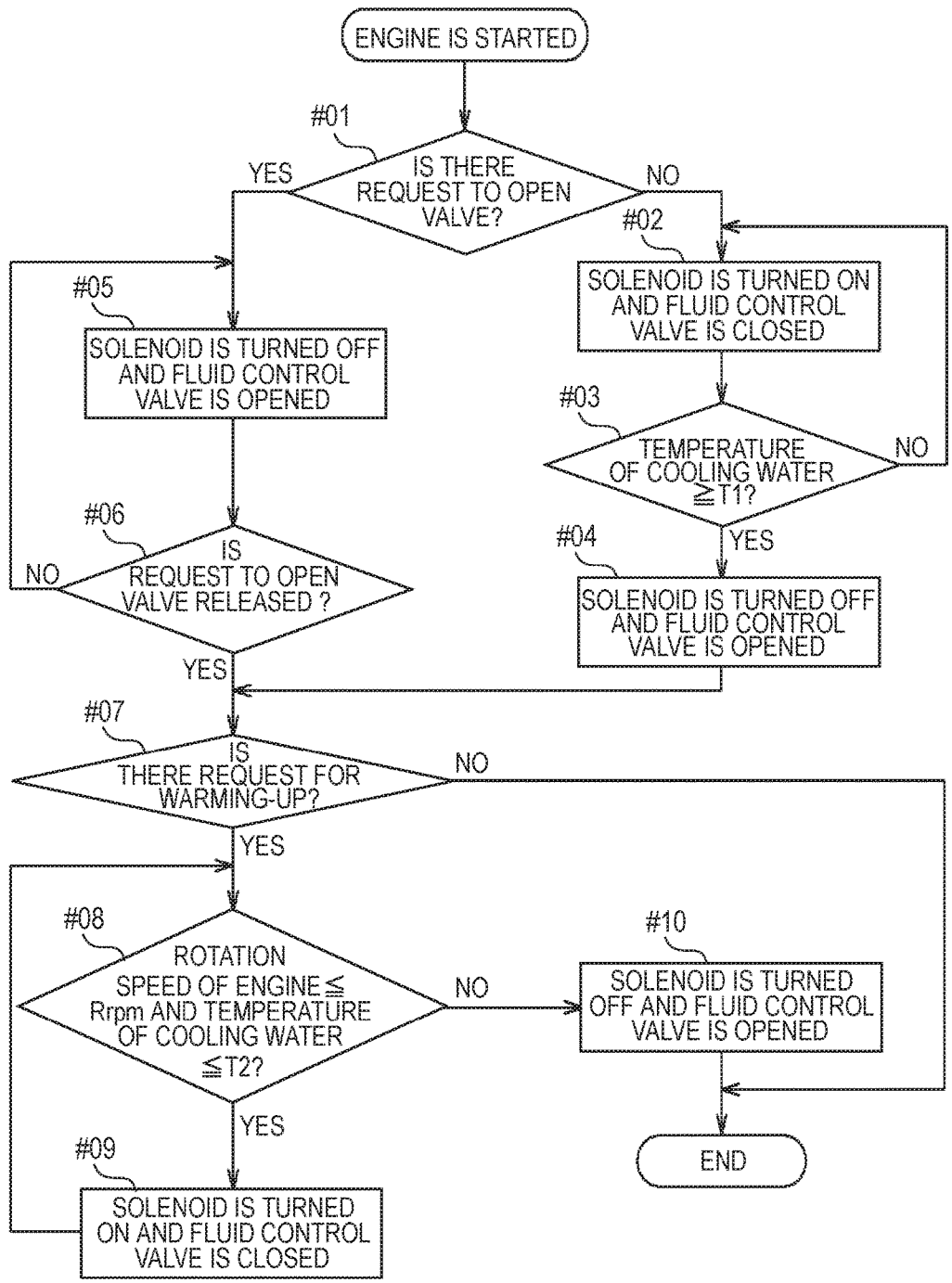
FIG. 7 is a flowchart illustrating a control flow of a fluid control valve.

An example of a control method using the above-described fluid control valve V is illustrated in FIG. 7. When the engine E is started, the solenoid B is in the non-energization, the second magnetic body 7 is separated from the first magnetic body 8 by the biasing force of the coil spring S, and the fluid control valve V is opened (see FIG. 2). First, it is determined whether or not there is a request to open the valve from the defroster or the like (#01). In a case where there is no request to open the valve (No determination in #01), the second magnetic body 7 is attracted to the first magnetic body 8 against the biasing force of the coil spring S by energizing the solenoid B, the second magnetic body 7 abuts against the first magnetic body 8, and the fluid control valve V is closed (#02, see FIG. 3). As a result, warming-up of the engine E is promoted. Next, when the temperature of cooling water is the warming-up completion temperature T1 or more (Yes determination in #03), the fluid control valve V is opened by stopping the energization of the solenoid B (#04). When the temperature of cooling water does not reach the warming-up completion temperature T1 (No determination in #03), the valve closed state of the fluid control valve V is maintained (#02).

On the other hand, in a case where there is a request to open the valve (Yes determination in #01), priority is given to control of fluid supply with high urgency, the valve opened state of the fluid control valve V is maintained in a state where the solenoid B is in the non-energization, cooling water circulates in the heater core H (#05). In a case where the request to open the valve is released (Yes determination in #06), when the temperature of cooling water does not reach the warming-up completion temperature T1, the fluid control valve V is closed again and warming-up is promoted (#02 to #04). When the temperature of cooling water reaches the warming-up completion temperature T1, the valve opened state is maintained to shift to a normal operation mode in which cooling water is circulated to the engine E.

If there is a request for warming-up (Yes determination in #07) after shifting to the normal operation mode, in a case where the rotation speed of the engine E is in a low rotation region (Rrpm or less) and cooling water is at a predetermined temperature T2 or less (Yes determination in #08), the solenoid B is energized and the fluid control valve V is closed (#09). As a result, the temperature of cooling water rises within a range not affecting the operation of the engine E. In a case where the temperature of cooling water is greater than the predetermined temperature T2 (No determination in #08), when the energization of the solenoid B is stopped and the fluid control valve V is opened (#10), cooling water having a high temperature circulates in the heater core H. Therefore, it is possible to warm up the passenger compartment quickly. In addition, in a case where the rotation speed of the engine E is greater than the low rotation region (No determination in #08), in order to prioritize cooling of the engine E, the energization of the solenoid B is stopped, the fluid control valve V is opened (#10), heat is exchanged in the radiator R and the heater core H, and the temperature of cooling water is decreased.

As another control method, for example, the fluid control valve V is individually disposed in the heater core H, an EGR cooler, a transmission, or the like, and the opening and closing operation is repeated as necessary. As described above, in the fluid control valve V frequently performing the opening and closing operation, even in a case where the water pressure cannot be controlled like the mechanical water pump P whose flow rate varies depending on the rotation speed of the engine E, it is desirable to quickly perform the opening and closing operation irrespective of the water pressure.

As illustrated in FIG. 2, the second magnetic body 7 is biased in a direction away from the first magnetic body 8 and when the solenoid B is not energized, the fluid control valve V is in the valve opened state. Therefore, even in a case where there is a valve opening request from the defroster or the like when the water pressure is low at the time of starting the engine E, it is possible to quickly open the valve to circulate cooling water. Moreover, since the valve is always opened when the engine is stopped, there is no disadvantage that the second magnetic body 7 and the first magnetic body 8 are fixed and the valve is difficult to be opened.

As illustrated in FIGS. 2 and 6, the shaft member 5 where the second magnetic body 7 is integrally formed with the other end portion is provided at a portion close to the arm portion 82 of the first magnetic body 8. Therefore, when the solenoid B is energized, a magnetic circuit is formed from the first magnetic body 8 toward the second magnetic body 7 via the shaft member 5 and the second magnetic body 7 is attracted to the first magnetic body 8. In this case, since the width L3 of the arcuate portion 82b of the arm portion 82 is formed to be smaller than the width L1 of the connection portion 82a or the width L2 of the magnetic flux throttling portion 83, it is possible to increase the magnetic flux density of the arcuate portion 82b (see FIG. 6). In addition, if the width L1 of the connection portion 82a of the arm portion 82 of the first magnetic body 8 is formed to be greater than the width L2 of the magnetic flux throttling portion 83, the magnetic flux easily flows to the arm portion 82 and it is possible to increase an amount of the magnetic flux flowing through the second magnetic body 7 via the shaft member 5. As a result, an attraction force between the first magnetic body 8 and the second magnetic body 7 is increased and it is possible to shift from the valve opened state to the valve closed state with a small amount of electric power.

In addition, as illustrated in FIGS. 2 and 5, the annular portion 63 of the support member 6 for receiving the pressure of cooling water flowing in from the inflow port 43a is provided between the first magnetic body 8 and the second magnetic body 7 to face the closing surface 71 of the second magnetic body 7 capable of closing the circulation hole 81 of the first magnetic body 8. The annular portion 63 of the support member 6 receives the water pressure and acts on the closing surface 71, and thereby it is possible to reduce the water pressure acting in a direction in which the second magnetic body 7 is separated from the first magnetic body 8. As a result, the fluid control valve V can be quickly shifted from the valve opened state to the valve closed state.

Furthermore, as illustrated in FIGS. 2 and 4, when the valve is opened, the water passage 45 and the connection passage 92b throttling the flow path area are formed between the back surface 7a of the second magnetic body 7 and the inner surface of the first housing 41 (the extending portion 44 and the stopper 9). As a result, the back surface 7a of the second magnetic body 7 receives the water pressure and the second magnetic body 7 is pressed against the first magnetic body 8. Therefore, the water pressure acting on the back surface 7a of the second magnetic body 7 assists the driving force of the solenoid B for attracting to the first magnetic body 8 and it is possible to further quickly close the valve. As in the embodiment, if the reservoir portion 45a for storing cooling water circulating in the water passage 45 is provided, cooling water from the reservoir portion 45a is easily circulated to the water passage 45. Therefore, it is possible to suppress a decrease in the water pressure acting on the back surface 7a of the second magnetic body 7 due to the interruption of the circulation of cooling water.

In addition, the shaft member 5 fixed to the other end portion of the second magnetic body 7 is guided by the support member 6. Therefore, the shaft member 5 does not shake, the movement of the second magnetic body 7 becomes smooth, and the opening and closing operation is stabilized. In the embodiment, as illustrated in FIG. 5, the groove portion 68 is provided on the inner surface of the support member 6 and the small hole 64a is provided at the bottom portion 64. Therefore, even in a case where foreign matters are mixed between the shaft member 5 and the support member 6, the foreign matters can be discharged from the groove portion 68 to the outside of the support member 6 via the small hole 64a. As a result, the movement of the shaft member 5 becomes smooth and the opening and closing operation of the second magnetic body 7 fixed to the end portion of the shaft member 5 is stabilized.

Second Embodiment

Hereinafter, a second embodiment will be described with reference to the drawings.

Moreover, since the control method and the operational effects are the same as those of the above-described embodiment, the description thereof will be omitted. In addition, detailed description of the same configurations as those of the first embodiment will be omitted.

Figure 8:
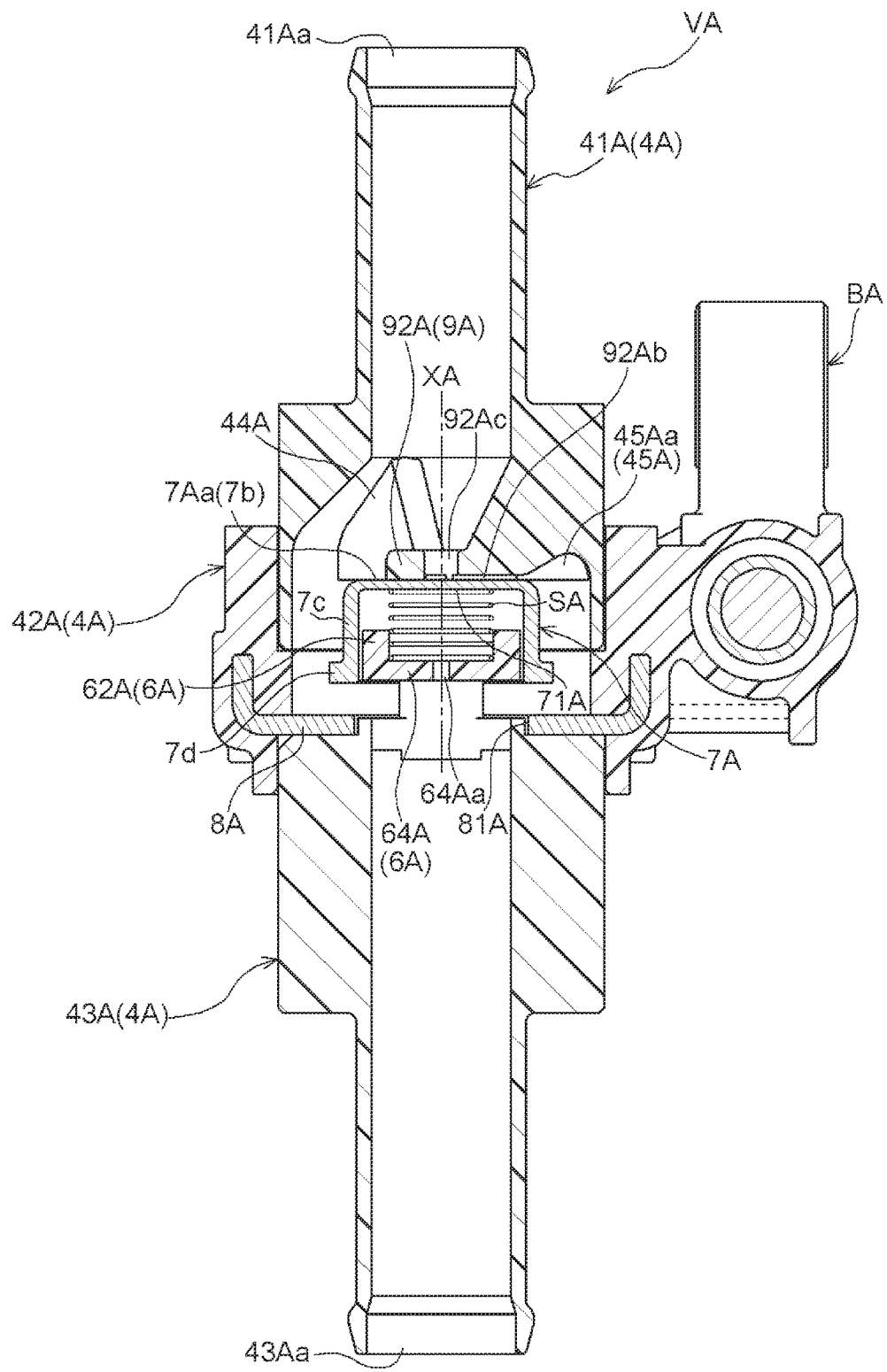
FIG. 8 is a longitudinal sectional view illustrating a fluid control valve of an opened state according to a second embodiment.
Figure 9:
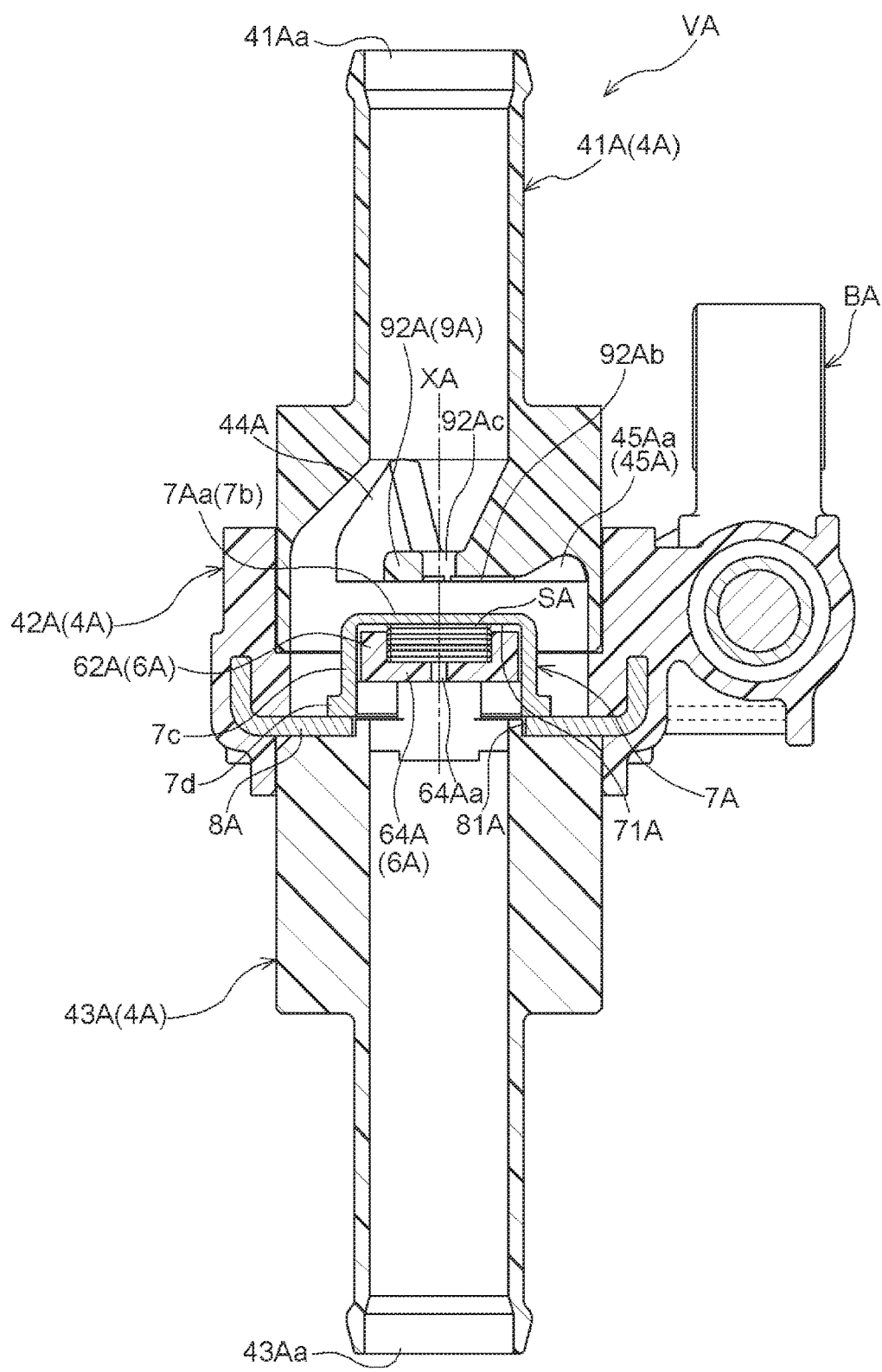
FIG. 9 is a longitudinal sectional view illustrating the fluid control valve in a closed state according to the second embodiment.
Figure 10:
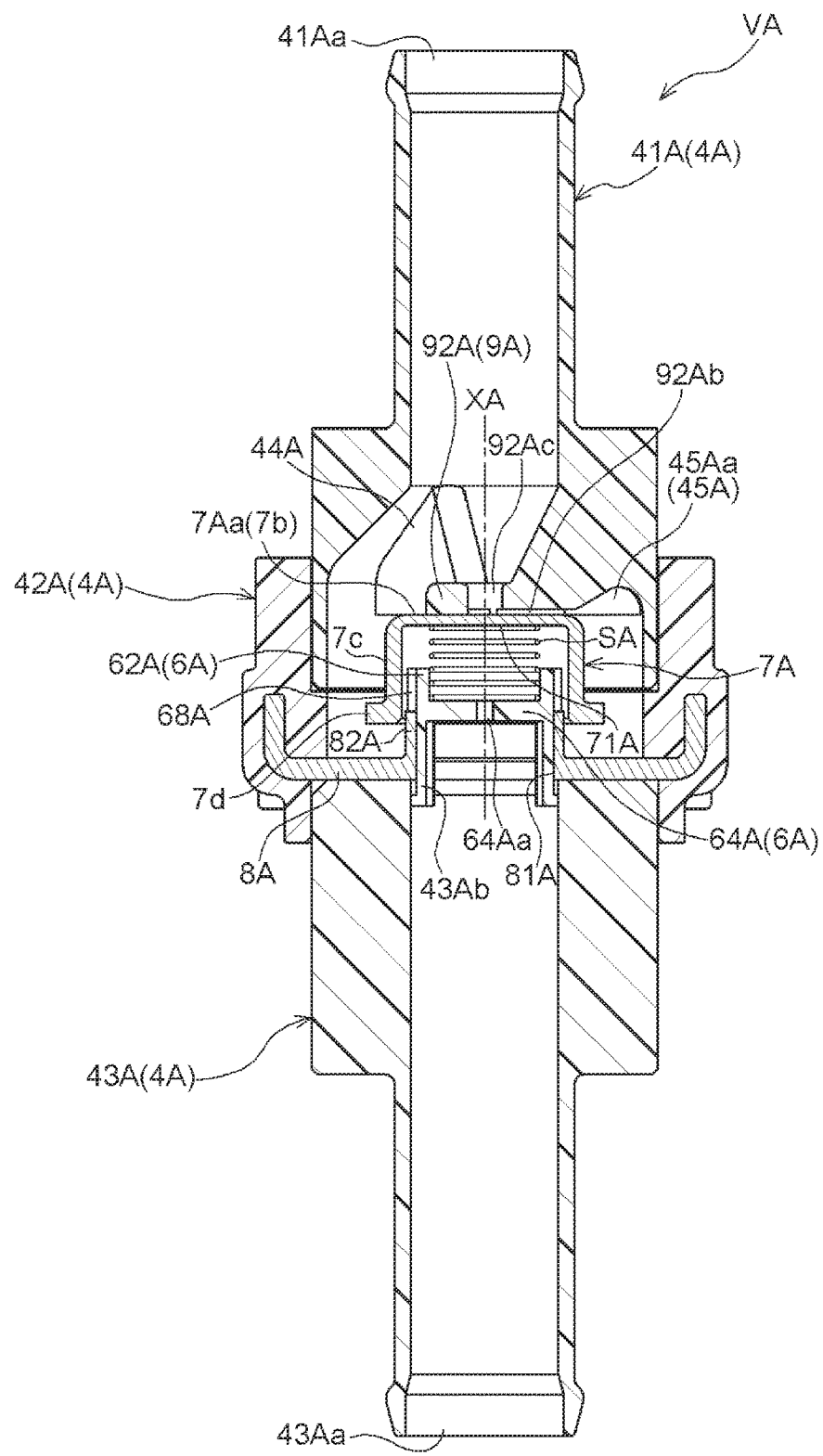
FIG. 10 is a longitudinal sectional view of the fluid control valve of FIG. 8 rotated by 90 degrees.

As illustrated in FIGS. 8 to 10, a fluid control valve VA includes a housing 4A, a stopper 9A that is fixed to the housing 4A, a guide member 6A that is fixed to the housing 4A, a coil spring SA (an example of a biasing member) that is stored in an inside of the guide member 6A, a first magnetic body 8A as a valve seat, a solenoid BA that causes a magnetic flux to flow through the first magnetic body 8A, and a second magnetic body 7A as a valve body. In the embodiment, the first magnetic body 8A and the second magnetic body 7A are made of a magnetic material such as iron. In addition, the housing 4A, the guide member 6A, and the stopper 9A are made of nonmagnetic resin, stainless steel, or the like.

The housing 4A includes a first housing 41A where the stopper 9A is fixed to an inside thereof, a second housing 42A in which the first magnetic body 8A is insert-molded, and a third housing 43A where the guide member 6A is fixed to an inside thereof.

In the first housing 41A, a plurality (three in the embodiment) of extending portions 44A are formed to extend from an inner surface of the first housing 41A and the cylindrical stopper 9A is integrally formed at end portions of the extending portions 44A. Since the extending portion 44A and the stopper 9A have the same configurations as the extending portion 44 and the stopper 9 in the first embodiment, the description thereof will be omitted. That is, a water passage 45A and a reservoir portion 45Aa of the extending portion 44A, and a connection passage 92Ab and a through-hole portion 92Ac of the stopper 9A respectively correspond to the water passage 45 and the reservoir portion 45a of the extending portion 44 and the connection passage 92b and the through-hole portion 92c of the stopper 9 in the first embodiment. In addition, since the second housing 42A has the same configuration as that of the second housing 42 in the first embodiment, the description thereof will be omitted.

As illustrated in FIG. 10, a plurality (two in the embodiment) of curved plate portions 43Ab disposed along an axial core XA are formed on an inner peripheral surface of the third housing 43A to be extended, and the guide member 6A is integrally formed with one end of the curved plate portion 43Ab. A connection portion of the curved plate portion 43Ab with the third housing 43A is provided on an inflow port 43Aa side with respect to the first magnetic body 8A, the curved plate portion 43Ab enters a circulation hole 81A of the first magnetic body 8A, and the guide member 6A is disposed on an outflow port 41Aa side with respect to the first magnetic body 8A.

Figure 11:
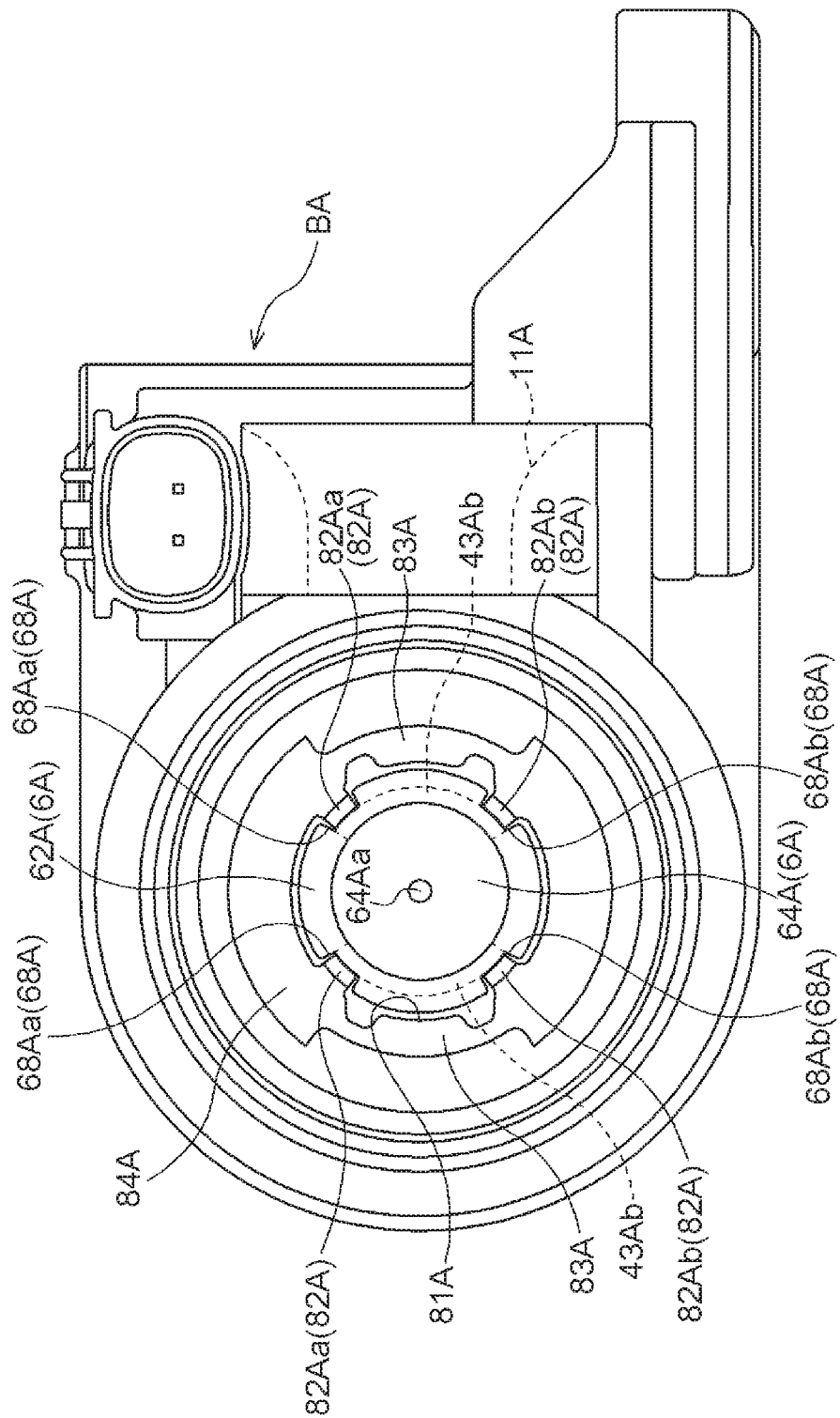
FIG. 11 is a plan view of a second housing according to the second embodiment.

The guide member 6A is configured in a bottomed cylindrical shape having a bottom portion 64A and a cylinder portion 62A connected to an outer periphery of the bottom portion 64A. The outer surface of the cylinder portion 62A of the guide member 6A and an outer surface of a part of the curved plate portion 43Ab are in sliding contact with an inner surface of the cup-shaped second magnetic body 7A, and guide the movement of the second magnetic body 7A. As illustrated in FIG. 11, a plurality (four in the embodiment) of groove portions 68A, which are recessed on an outer surface of the cylinder portion 62A inward in the radial direction, are formed in the guide member 6A at equal intervals along the circumferential direction. A rising portion 82A of the first magnetic body 8A which is described later is inserted into the groove portions 68A. In addition, the curved plate portion 43Ab is disposed between outer side surfaces of a pair of adjacent groove portions 68Aa and 68Ab, and a thickness of the curved plate portion 43Ab is set to be equal to a thickness of the groove portions 68Aa and 68Ab.

As illustrated in FIGS. 8 to 10, the bottom portion 64A (an example of the fluid pressure receiving portion) of the guide member 6A faces a closing surface 71A of the second magnetic body 7A and is configured to receive the pressure of cooling water flowing in from the inflow port 43Aa. In addition, a small hole 64Aa is formed in the bottom portion 64A of the guide member 6A. In a case where foreign matters are mixed between the guide member 6A and the second magnetic body 7A, the foreign matters are discharged from the groove portion 68A of the guide member 6A to the outside of the guide member 6A via the small hole 64Aa.

As illustrated in FIGS. 8 to 10, the coil spring SA is stored in the inside of the guide member 6A in a state of abutting against the bottom portion 64A of the guide member 6A and the closing surface 71A of the second magnetic body 7A. The coil spring SA biases the second magnetic body 7A toward the outflow port 41Aa so that the second magnetic body 7A is separated from the first magnetic body 8A. Moreover, the cylindrical member for storing the coil spring SA may be formed to extend from the bottom portion 64A of the guide member 6A.

The first magnetic body 8A is provided with the circulation hole 81A through which cooling water circulates. As illustrated in FIG. 11, an annular peripheral portion 84A around the circulation hole 81A functions as a valve seat against which a collar portion 7d of the second magnetic body 7A which is described later abuts. The first magnetic body 8A is formed in a plate shape integrated with a fixed yoke 11A of the solenoid BA and is insert-molded in the second housing 42A together with the fixed yoke 11A.

The first magnetic body 8A has a plurality (four in the embodiment) of rising portions 82A which are vertically erected from the peripheral portion 84A of the circulation hole 81A along the axial core XA. The rising portion 82A faces the inner surface of the second magnetic body 7A in a state of being inserted into the groove portion 68A of the guide member 6A (see FIG. 10). In addition, the first magnetic body 8A is provided with a plurality of magnetic flux throttling portions 83A whose widths are reduced at a portion of the peripheral portion 84A through which the magnetic flux passes. A pair of the rising portions 82Aa and 82Ab are provided so as to extend from regions on both sides of the peripheral portion 84A in which one magnetic flux throttling portion 83A is interposed therebetween. Therefore, the magnetic flux density of the rising portion 82A is increased so that an amount of the magnetic flux flowing through the second magnetic body 7A can be increased. As a result, the attraction force between the first magnetic body 8A and the second magnetic body 7A is increased and it is possible to shift from the valve opened state to the valve closed state with a small amount of electric power.

Since the solenoid BA has the same configuration as that of the solenoid B in the first embodiment, the description thereof will be omitted.

As illustrated in FIGS. 8 to 10, the second magnetic body 7A is formed in a cup shape and functions as a valve body. The second magnetic body 7A includes a bottom wall portion 7b, a peripheral wall portion 7c that extends from the bottom wall portion 7b toward the first magnetic body 8A, and the collar portion 7d formed by enlarging a diameter of an end portion of the peripheral wall portion 7c on the outside in the radial direction. The bottom wall portion 7b of the second magnetic body 7A has the closing surface 71A capable of closing the circulation hole 81A of the first magnetic body 8A. During closing the valve, the collar portion 7d abuts against the peripheral portion 84A of the circulation hole 81A so that the closing surface 71A of the second magnetic body 7A closes the circulation hole 81A of the first magnetic body 8A (see FIG. 9).

On the other hand, during opening the valve, an annular collar portion 92A of the stopper 9A abuts against a portion on the inside of a back surface 7Aa of the closing surface 71A of the second magnetic body 7A in the radial direction to prevent the movement of the second magnetic body 7A (see FIGS. 8 and 10). In this case, cooling water circulates from the inflow port 43Aa toward the outflow port 41Aa with a space formed between the outside of the second magnetic body 7A in the radial direction and the extending portion 44A of the first housing 41A as a main flow path. In addition, a sub-flow path, through which cooling water flows into the reservoir portion 45Aa of the water passage 45A and circulates in the water passage 45A of the extending portion 44A, the connection passage 92Ab of the stopper 9A, and the through-hole portion 92Ac of the stopper 9A in this order, is also formed.

Other Embodiments (1) In the above-described embodiments, the water passages 45 and 45A of the extending portions 44 and 44A and the connection passages 92b and 92Ab of the stoppers 9 and 9A as the flow path throttling portions may be omitted. Also in this case, the water pressure acting on the second magnetic bodies 7 and 7A is reduced by the annular portion 63 of the support member 6 or the bottom portion 64A of the guide member 6A as the fluid pressure receiving portion so that it is possible to quickly close the valve.

(2) In the above-described embodiments, the annular portion 63 of the support member 6 or the bottom portion 64A of the guide member 6A is formed over the circumferential direction as the fluid pressure receiving portion, but may be provided at a region of a part thereof in the circumferential direction. Also in this case, the water pressure acting on the second magnetic bodies 7 and 7A can be somewhat reduced.

(3) In the second embodiment, not only the groove portion 68A of the guide member 6A into which the rising portion 82A of the first magnetic body 8A is inserted, but also a different groove portion formed by being recessed on the inside in the radial direction may be further provided. Therefore, even in a case where foreign matters are mixed between the guide member 6A and the second magnetic body 7A, the foreign matters can be reliably discharged to the outside of the guide member 6A.

(4) In the second embodiment, a through-hole may be formed at a portion of the curved plate portion 43Ab of the guide member 6A on a stopper 9A side with respect to the first magnetic body 8A. In this case, during opening the valve, cooling water is circulated between the through-hole and the extending portion 44A of the first housing 41A so that it is possible to reduce the flow path resistance in the main flow path.

(5) In the above-described embodiments, the second magnetic bodies 7 and 7A may be partially covered by resin without exposing an entire region.

(6) In the above-described embodiments, the inflow ports 43a and 43Aa, and the outflow ports 41a and 41Aa may be disposed such that the axial cores X and XA are shifted from each other.

(7) The pump which circulates the fluid in the flow path in which the fluid control valves V and VA are disposed is not limited to the water pump P for supplying cooling water for the engine E, and may be an oil pump for circulating engine oil, and may be used for application other than a vehicle. In addition, the water pump P may be an electric pump using a three-phase AC motor or the like instead of the mechanical pump.

This disclosure can be applied to the fluid control valve that can intercept the circulation of the fluid.

A feature of a fluid control valve according to an aspect of this disclosure resides in that the fluid control valve includes a housing that has an inflow port and an outflow port of a fluid; a first magnetic body in which a circulation hole through which the fluid circulates is provided; a solenoid that causes a magnetic flux to flow through the first magnetic body; a second magnetic body that is attracted to the first magnetic body by flowing of the magnetic flux generated from the solenoid so as to abut against a peripheral portion of the circulation hole to close the circulation hole; a biasing member that biases the second magnetic body in a direction of separating from the first magnetic body; and a stopper that is fixed to the housing on a side of the outflow port and prevents movement of the second magnetic body by a biasing force of the biasing member, in which a fluid pressure receiving portion for receiving a pressure of the fluid flowing in from the inflow port is provided between the first magnetic body and the second magnetic body to face a closing surface of the second magnetic body capable of closing the circulation hole.

In this configuration, the first magnetic body, the second magnetic body that closes the circulation hole of the first magnetic body by being attracted to the first magnetic body by energizing the solenoid, and the biasing member that biases the second magnetic body in the direction of separating from the first magnetic body are provided. That is, the fluid control valve is in a valve opened state by the biasing force of the biasing member when the solenoid is not energized. Therefore, when the fluid pressure is low at a time of starting an engine, for example, even in a case where there is a request to open the valve from a defroster or the like, it is possible to open the valve promptly and cause the fluid to circulate. Furthermore, since the valve is always in the valve opened state when the engine is stopped, there is no inconvenience that the first magnetic body and the second magnetic body are fixed and the valve is difficult to be opened.

In addition, in this configuration, the fluid pressure receiving portion for receiving the pressure of the fluid flowing in from the inflow port is provided between the first magnetic body and the second magnetic body to face the closing surface of the second magnetic body capable of closing the circulation hole. As a result, the pressure of the fluid acting on the closing surface and operating in the direction of separating the second magnetic body from the first magnetic body can be decreased by the fluid pressure receiving portion. Therefore, it is possible to close the valve quickly. Therefore, it is possible to provide the fluid control valve capable of being opened and closed quickly and reliably.

Another feature resides in that the fluid control valve further includes a shaft member that moves inside the housing; and a bottomed cylindrical support member that is fixed to the housing on a side of the inflow port with respect to the first magnetic body, supports one end portion side of the shaft member, and guides movement of the shaft member, in which the second magnetic body is formed on the other end portion side of the shaft member, and the fluid pressure receiving portion is formed by enlarging a diameter of an end portion on a second magnetic body side in the support member outward in a radial direction.

According to this configuration, the shaft member in which the second magnetic body is formed on the other end portion side of the shaft member is guided by the support member. Therefore, the shaft member does not shake and the movement of the second magnetic body becomes smooth, and an opening and closing operation is stabilized. Furthermore, the fluid pressure receiving portion is formed by enlarging the diameter of the end portion of the support member. Therefore, it is easy to process the fluid pressure receiving portion and it is possible to save the number of components.

Another feature resides in that a groove portion that is recessed to the outside in the radial direction with respect to the shaft member is formed on an inner surface of the support member, and a small hole is formed to penetrate through a bottom portion of the support member.

As in this configuration, if the groove portion is provided on the inner surface of the support member and the small hole is provided at the bottom portion, even in a case where foreign matters are mixed between the shaft member and the support member, the foreign matters can be discharged from the groove portion to the outside of the support member via the small hole. As a result, the movement of the shaft member becomes smooth and the opening and closing operation of the second magnetic body fixed to the end portion of the shaft member is stabilized.

Another feature resides in that the fluid control valve further includes a bottomed cylindrical guide member that is fixed to the housing and has a bottom portion and a cylinder portion that is connected to an outer periphery of the bottom portion to guide the movement of the second magnetic body, in which the second magnetic body has a peripheral wall portion which is in sliding contact with an outer surface of the cylinder portion and a bottom wall portion including the closing surface, and the fluid pressure receiving portion is configured with the bottom portion of the guide member facing the bottom wall portion.

According to this configuration, the second magnetic body is guided by the guide member. Therefore, the movement of the second magnetic body becomes smooth and the opening and closing operation is stabilized. Furthermore, the fluid pressure receiving portion is configured with the bottom portion of the guide member facing the closing surface. Therefore, a pressure receiving area for receiving the pressure of the fluid is increased. Therefore, the pressure of the fluid acting in the direction in which the second magnetic body is separated from the first magnetic body can be reliably reduced. Therefore, it is possible to close the valve further quickly.

Another feature resides in that a flow path throttling portion whose flow path area is throttled is formed at a portion of the flow path between a back surface of the second magnetic body abutting against the stopper and an inner surface of the housing.

In this configuration, the first magnetic body, the second magnetic body that closes the circulation hole of the first magnetic body by being attracted to the first magnetic body by energizing the solenoid, and the biasing member that biases the second magnetic body in the direction of separating from the first magnetic body are provided. That is, when the solenoid is not energized the fluid control valve is in the valve opened state by the biasing force of the biasing member. Therefore, when the fluid pressure is low at the time of starting the engine, for example, even in a case where there is a request to open the valve from a defroster or the like, it is possible to open the valve promptly and cause the fluid to circulate. Furthermore, since the valve is always in the valve opened state when the engine is stopped, there is no inconvenience that the first magnetic body and the second magnetic body are fixed and the valve is difficult to be opened.

In addition, in this configuration, the flow path throttling portion is formed between the back surface of the second magnetic body and the inner surface of the housing. As a result, at the time of valve opening, the back surface of the second magnetic body always receives the pressure of the fluid and the second magnetic body is pressed toward the first magnetic body. Therefore, the pressure of the fluid acting on the back surface of the second magnetic body assists the driving force of the solenoid for attracting to the first magnetic body and thereby it is possible to quickly close the valve. Therefore, it is possible to provide the fluid control valve that can be opened and closed quickly and reliably.

Another feature resides in that a reservoir portion for storing the fluid circulating through the flow path throttling portion is formed on a side of the second magnetic body in the flow path throttling portion so as to be recessed on the inner surface of the housing.

As in this configuration, if the reservoir portion for storing the fluid circulating in the flow path throttling portion is provided, the fluid from the reservoir portion is likely to circulate in the flow path throttling portion. Therefore, it is possible to suppress a decrease in the fluid pressure acting on the back surface of the second magnetic body due to interruption of the circulation of the fluid. In addition, since the reservoir portion is formed by causing the inner surface of the housing to be recessed, processing is easy. Therefore, it is possible to close the valve further quickly with a simple structure.

Another feature resides in that the fluid pressure receiving portion for receiving the pressure of the fluid flowing in from the inflow port is provided between the first magnetic body and the second magnetic body so as to face the closing surface of the second magnetic body capable of closing the circulation hole.

As in this configuration, if the fluid pressure receiving portion is provided to face the closing surface of the second magnetic body, it is possible to reduce the pressure of the fluid acting on the second magnetic body in the direction in which the second magnetic body is separated from the first magnetic body. As a result, it is possible to close the valve further quickly by reducing the operation of the pressure of the fluid acting in the direction in which the second magnetic body is opened while applying the pressure of the fluid to the back surface of the second magnetic body.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A fluid control valve comprising:
    a housing that has an inflow port and an outflow port of a fluid;
    a first magnetic body in which a circulation hole through which the fluid circulates is provided;
    a solenoid that causes a magnetic flux to flow through the first magnetic body;
    a second magnetic body that is attracted to the first magnetic body by flowing of the magnetic flux generated from the solenoid so as to abut against a peripheral portion of the circulation hole to close the circulation hole;
    a biasing member that biases the second magnetic body in a direction of separating from the first magnetic body;
    a stopper that is fixed to the housing on a side of the outflow port and prevents movement of the second magnetic body by a biasing force of the biasing member;
    a shaft member that moves inside the housing; and
    a bottomed cylindrical support member that is fixed to the housing on a side of the inflow port with respect to the first magnetic body, supports one end portion side of the shaft member, and guides movement of the shaft member,
    wherein the second magnetic body is formed on the other end portion side of the shaft member,
    a fluid pressure receiving portion for receiving a pressure of the fluid flowing in from the inflow port is provided between the first magnetic body and the second magnetic body to face a closing surface of the second magnetic body capable of closing the circulation hole, and
    the fluid pressure receiving portion is formed by enlarging a diameter of an end portion on a second magnetic body side in the support member outward in a radial direction.

2. The fluid control valve according to claim 1,
    wherein a groove portion that is recessed to the outside in the radial direction with respect to the shaft member is formed on an inner surface of the support member, and
    a small hole is formed to penetrate through a bottom portion of the support member.

3. The fluid control valve according to claim 2,
    wherein a flow path throttling portion whose flow path area is throttled is formed at a portion of the flow path between a back surface of the second magnetic body abutting against the stopper and an inner surface of the housing.

4. The fluid control valve according to claim 3,
    wherein a reservoir portion for storing the fluid circulating through the flow path throttling portion is formed on a side of the second magnetic body in the flow path throttling portion so as to be recessed on the inner surface of the housing.

5. The fluid control valve according to claim 1, further comprising:
    a bottomed cylindrical guide member that is fixed to the housing and has a bottom portion and a cylinder portion that is connected to an outer periphery of the bottom portion to guide the movement of the second magnetic body,
    wherein the second magnetic body has a peripheral wall portion which is in sliding contact with an outer surface of the cylinder portion and a bottom wall portion including the closing surface, and
    the fluid pressure receiving portion is configured with the bottom portion of the guide member facing the bottom wall portion.

6. The fluid control valve according to claim 5,
    wherein a flow path throttling portion whose flow path area is throttled is formed at a portion of the flow path between a back surface of the second magnetic body abutting against the stopper and an inner surface of the housing.

7. The fluid control valve according to claim 6,
wherein a reservoir portion for storing the fluid circulating through the flow path throttling portion is formed on a side of the second magnetic body in the flow path throttling portion so as to be recessed on the inner surface of the housing.

8. The fluid control valve according to claim 1,
wherein a flow path throttling portion whose flow path area is throttled is formed at a portion of the flow path between a back surface of the second magnetic body abutting against the stopper and an inner surface of the housing.

9. The fluid control valve according to claim 8,
wherein a reservoir portion for storing the fluid circulating through the flow path throttling portion is formed on a side of the second magnetic body in the flow path throttling portion so as to be recessed on the inner surface of the housing.

10. The fluid control valve according to claim 9,
wherein the fluid pressure receiving portion for receiving the pressure of the fluid flowing in from the inflow port is provided between the first magnetic body and the second magnetic body so as to face the closing surface of the second magnetic body capable of closing the circulation hole.

11. The fluid control valve according to claim 8,
wherein the fluid pressure receiving portion for receiving the pressure of the fluid flowing in from the inflow port is provided between the first magnetic body and the second magnetic body so as to face the closing surface of the second magnetic body capable of closing the circulation hole.

* * * * *